US006642324B2

(12) United States Patent
Bergmeister et al.

(10) Patent No.: US 6,642,324 B2
(45) Date of Patent: Nov. 4, 2003

(54) PROCESS THAT PRODUCES POLYMERS

(75) Inventors: Joseph J. Bergmeister, Bartlesville, OK (US); Steven J. Secora, Bartlesville, OK (US); Gerhard Guenther, Kemah, TX (US); Elizabeth A. Benham, Bartlesville, OK (US); Max P. McDaniel, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 114 days.

(21) Appl. No.: 09/773,294

(22) Filed: Jan. 31, 2001

(65) Prior Publication Data

US 2001/0004663 A1 Jun. 21, 2001

Related U.S. Application Data

(62) Division of application No. 09/203,094, filed on Dec. 1, 1998, now Pat. No. 6,201,077.

(51) Int. Cl.$^7$ .................................................. C08F 4/42
(52) U.S. Cl. ........................ 526/129; 526/352; 526/348; 526/104; 526/106; 526/130; 525/120
(58) Field of Search ................................ 526/352, 348, 526/104, 106, 129, 130; 525/120

(56) References Cited

U.S. PATENT DOCUMENTS

| | | | | | |
|---|---|---|---|---|---|
| 3,887,494 | A | * | 6/1975 | Dietz ........................... | 252/452 |
| 4,312,967 | A | * | 1/1982 | Norwood et al. .............. | 526/64 |
| 5,071,927 | A | * | 12/1991 | Benham et al. ................ | 526/64 |
| 5,115,068 | A | * | 5/1992 | Bailey et al. ............. | 526/348.5 |
| 5,274,056 | A | * | 12/1993 | McDaniel et al. ........... | 526/106 |
| 5,599,887 | A | * | 2/1997 | Badley et al. .............. | 526/105 |

* cited by examiner

Primary Examiner—Ling-Siu Choi
(74) Attorney, Agent, or Firm—Williams, Morgan and Amerson

(57) ABSTRACT

A process comprising polymerizing ethylene, or polymerizing ethylene and at least one other olefin, to produce a polymer is provided.

9 Claims, No Drawings

PROCESS THAT PRODUCES POLYMERS

This application is a division of application Ser. No. 09/203,094, filed Dec. 1, 1998, now U.S. Pat. No. 6,201,077.

FIELD OF THE INVENTION

This invention is related to the field of processes that polymerize ethylene, or that polymerize ethylene and at least one other olefin, to produce a polymer.

BACKGROUND OF THE INVENTION

There are many processes that polymerize ethylene, or that polymerize ethylene and at least one other olefin, to produce a polymer. There are also many manufacturing processes that use these types of polymers to produce useful items. One of these manufacturing processes is called blow molding.

In general, blow molding is useful for producing hollow plastic products. A principle advantage of blow molding is its ability to produce hollow shapes without having to join two or more separately molded parts.

In order to produce a good quality blow molded product, one needs to start with a good quality polymer. However, producing such good quality polymers is difficult. It has been especially difficult to produce a good quality polymer that has a high environmental stress crack resistance (ESCR) and that is useful for blow molding applications.

Therefore, the inventors provide this invention so that such good quality polymers with high ESCR's are more readily obtainable, and readily useable in blow molding applications.

SUMMARY OF THE INVENTION

It is an object of this invention to provide a process to polymerize ethylene, or ethylene and at least one other olefin to produce a polymer.

It is also an object of this invention to provide said polymer.

In accordance with this invention a process is provided. The process comprises (or optionally "consists essentially of", or "consists of") polymerizing ethylene, or polymerizing ethylene and at least one other olefin, to produce a polymer, wherein said polymerizing is conducted in a polymerization zone, and wherein said polymerizing is conducted using a catalyst and a cocatalyst, and wherein said catalyst comprises chromium on a support, and wherein the amount of said chromium on said support is from about 0.5 to 5 weight percent, and wherein said support comprises silica, in major part, and wherein the amount of titanium in said support is greater than about 3.5 to about 10 weight percent based on the weight of said support, and wherein said support has a surface area from about 400 to about 800 square meters per gram, and wherein said support has a pore volume from about 1.8 to about 4 cubic centimeters per gram, and wherein said catalyst has been activated at a temperature in the range of about 600° F. to about 1100° F. in the presence of an oxidizing ambient, and wherein said cocatalyst is an organoboron compound.

In accordance with this invention a polymer comprising the following properties: a density from about 0.94 to about 0.96, a high load melt index from about 5 to about 45 g/10 min., a shear ratio (high load melt index/melt index) from about 150 to about 400, a heterogeneity index from about 15 to about 55, an ESCR condition A greater than about 1000 hours, and ESCR Condition B greater than about 200 hours, a normalized die swell from about 0.8 to about 1.1, a weight swell from about 300 to about 500 percent, and an onset of melt fracture greater than about 2000 $sec^{-1}$.

These and other objects will become more apparent with the following.

The terms "comprise", "comprises" and "comprising" are open-ended and do not exclude the presence of other steps, elements, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as along as such steps, elements, or materials, do not affect the basic and novel characteristics of the invention, additionally, they do not exclude impurities normally associated with the elements and materials used.

The previous terms and phrases are intended for use in areas outside of U.S. jurisdiction. Within the U.S. jurisdiction the above terms and phrases are to be applied as they are construed by U.S. courts and the U.S. Patent Officeu.

DETAILED DESCRIPTION OF THE INVENTION

This polymerization can be carried out in any manner known in the art such as gas phase, solution or slurry polymerization conditions. A stirred reactor can be utilized for a batch process, or the reaction can be carried out continuously in a loop reactor.

This polymerization is conducted in a polymerization zone. It is preferred to conduct this polymerization in a loop reactor. It is more preferred when said polymerization is conducted in a loop reactor under slurry polymerization conditions. Currently, the preferred diluent for slurry polymerization is isobutane.

Loop reactors are known in the art, see, for example, U.S. Pat. Nos. 3,248,179; 4,424,341; 4,501,855; and 4,613,484; the entire disclosures of which are hereby incorporated by reference. Especially preferred processes are disclosed in U.S. Pat. Nos. 4,589,957; 4,737,280; 5,597,892; and 5,575,979 the entire disclosures of which are also hereby incorporated by reference.

A preferred polymerization technique is that which is referred to as a particle form, or slurry process, wherein the temperature is kept below the temperature at which polymer swells and fouls the reactor. Such polymerization techniques are well known in the art and are disclosed, for example, in Norwood, U.S. Pat. No. 3,248,179, the disclosure of which is hereby incorporated by reference.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors.

The diluent, before it enters the reactor, comprises isobutane. Additionally, before the diluent enters the reactor, the majority of said diluent is isobutane. It is preferred when the diluent contains 60–100, more preferably, 70–100, and most preferably 80–100 weight percent isobutane based on the weight of the diluent before it enters the reactor.

The polymerization is conducted at a temperature from about 190° F. to about 230° F. However, it is preferred when said polymerizing is conducted at a temperature from about 195° F. to about 225° F. and it even more preferred when said polymerizing is conducted at a temperature from 200° F. to 220° F. At temperatures below about 190° F. the efficiency of the catalyst and the reactor is adversely affected. At temperatures above about 230° F. the reactor could foul due to the swelling of the polymer.

The pressure that the polymerization is conducted at is in the range of about 400 psia to about 800 psia, preferably about 500 psia to about 700 psia. The catalyst used in this invention comprises chromium on a support, preferably in the form of chromium oxide on a support. The amount of chromium on said support is in the range of about 0.5 to about 5 weight percent, preferably about 1 to about 4 weight percent, and most preferably from 1.5 to 3 weight percent, where such weight percents are based on the weight of the support.

The support comprises silica and titania. Additionally, such support has silica, as its major component by weight, and titania, as its minor component by weight. It is most preferred when said support consists essentially of silica and titania, with little, if any, impurities. It is even more preferred when the silica and titania are cogelled.

It is preferred when the amount of titanium in the support is from about 3.5 to about 10 weight percent, preferably about 4 to about 8 percent, and most preferably from 4 to 6 weight percent, where said weight percents are based on the weight of the support. When the amount of titanium is less than about 3.5 weight percent, the ESCR of the resin produced tends to be too low. When the amount of titanium is greater than about 10 weight percent, the catalyst becomes thermally unstable and processability of the resin produced tends to be undesirable.

The support should have a surface area from about 400 to about 800 square meters per gram. It is more preferred when the support has a surface area from about 425 to 700 square meters per gram, and it is most preferred when said support has a surface area from 450 to 650 square meters per gram. Surface areas below about 400 $m^2/g$ tend to have less activity, less ESCR, and too little die swell, while surface areas above about 800 $m^2/g$ produces polymers that have a die swell that is too high, an amount of long chain branching that is too low, and possibly, a melt index that is too low.

The support should have a pore volume from about 1.8 to about 4 cubic centimeters per gram. It is more preferred when the support has a pore volume from about 1.9 to about 3 $cm^3/g$, and it is most when said support has a pore volume from 2 to 2.7 $cm^3/gram$. Pore volumes below about 1.8 $cm^3/g$ produce polymer with low ESCR, while pore volumes above about 4 $cm^3/g$ are difficult to handle in commercial operations.

Methods of producing these types of catalysts are known in the art. See for example, U.S. Pat. Nos. 3,900,457; 4,081,407; 4,392,990; 4,405,501; 4,735,931; 4,981,831; the disclosures of which are hereby incorporated by reference.

The catalyst should be activated in the presence of an oxidizing ambient (sometime referred to as "atmosphere") at a temperature greater than about 600° F. to about 1100° F. It is even more preferred when the temperature is from about 700° F. to less than 1100° F., and it is even more preferred when the temperature is from about 900° F. to about 1090° F., and it is most preferred when the temperature is from about 900° F. to about 1050° F. At temperatures below about 600° F. the activity of the catalyst is reduced and the physical properties of the polymer are adversely affected. At temperatures above about 1100° F. there is a loss of ESCR in the polymer. Currently, the preferred oxidizing ambient is air. This activation is carried out for a time period of about 1 minute to about 50 hours. This allows a portion of the chromium in a lower valance state to be converted to a hexavalent state.

The ethylene used should be polymerization grade ethylene. The other olefins that can be used are alpha-olefins having from 4 to 12 carbon atoms. Currently, 1-butene, 1-hexene, and 1-octene are the most preferred olefins.

The catalyst must be used in the presence of a cocatalyst that is an organoboron compound. Organoboron compounds, as used in this invention, have the following general formula: $B(X)_3$.

In this formula (X) is a hydrocarbyl having from 1–20 carbon atoms. Currently, it is preferred when (X) is an alkyl having from 1 to 10 carbon atoms. However, it is most preferred when (X) is selected from the group consisting of methyl, ethyl, propyl, butyl, and isobutyl.

Examples of such compounds are as follows:

trimethylboron;

triethylboron;

tripropylboron;

tributylboron; and triisobutylboron.

Currently, triethylboron is preferred.

The amount of organoboron compound to use in this invention is from about 1 to about 15 parts per million by weight, based on the weight of the diluent before it enters the reactor. However, it is preferred when the amount is from about 1 to about 10, and it is most preferred when the amount is from 2 to 4 parts per million.

The polymer produced needs to have the following properties in order to be a polymer that is good for blow molding applications.

The density needs to be from about 0.94 to 0.96 grams per cubic centimeter. However, it is preferred when the density is from about 0.95 $g/cm^3$ to 0.96 $g/cm^3$ and it is more preferred when the density is from 0.953 $g/cm^3$ to 0.958 g/cm. This density is determined in accordance with ASTM D1505.

The high load melt index needs to be from about 5 to about 45 grams per ten minutes. However, it is preferred when the high load melt index is from about 8 g/10 min to about 35 g/10 min. and it is even more preferred when the high load melt index is from 10 g/10 min. to 25 g/10 min. This high load melt index is determined in accordance with ASTM D 1238.

The shear ratio (HLMI/MI) needs to be from about 150 to about 400. However, it is preferred when the shear ratio is from about 170 to about 350 and it is even more preferred when the shear ratio is from 180–320.

The heterogeneity index (Mw/Mn) needs to be from about 15 to about 55. However, it is preferred when the heterogeneity index is from 20 to 50 and it is even more preferred when the heterogeneity index is from 25 to 45, and it is most preferred when the Heterogeneity index is from 30 to 40. The heterogeneity index was determined by gel permeation chromatography.

The ESCR Condition A of the polymer is greater than 1000 hours. The ESCR Condition B of the polymer is greater than 200 hours, preferably greater than 300 hours. These ESCR's are measured according to ASTM D1693, Conditions A and B. Additionally, the polymer should have a bottle ESCR greater than 700 hours as measure in accordance with the examples below.

The die swell is an indication of how much the molten polymer tends to flare out as it is extruded from the die. The normalized die swell should be between about 0.8 and about 1.1, preferably, about 0.9 and about 1.05, and most preferably, from 0.95 to 1.05. Normalized die swell outside this range leads to poor bottle molding. High die swell results in the parison extending beyond the mold, leading to, for example, "pinch-off" or other problems. Low die swell can cause a failure to fill the mold.

Weight swell is a measure of how much memory the polymer retains as it is extruded. A 300 weight percent swell indicates that the final bottle wall thickness is three times the die gap distance. If the polymer has a characteristically high weight swell, it requires a smaller die gap to produce the required wall thickness, and a smaller gap can restrict polymer flow, and thus machine output. The weight swell should be between about 300 and about 500 weight percent, preferably, about 325 and about 475 weight percent, and most preferably, from 350 to 450 weight percent.

The onset of melt fracture should be greater that 2000 $sec^{-1}$.

EXAMPLES

These examples are provided to further illustrate the invention. The scope of the invention should not be limited to these examples.

Tests

A "Quantachrome Autosorb-6 Nitrogen Pore Size Distribution Instrument" was used to determined the surface area and pore volume of the supports. This instrument was acquired from the Quantachrome Corporation, Syosset, N.Y.

Polymer density was determined in grams per cubic centimeter (g/cc) on a compression molded sample, cooled at 15° C. per hour, and conditioned for 40 hours at room temperature in accordance with ASTM D1505 and ASTM D1928, procedure C.

High load melt index (HLMI, g/10 mins) was determined in accordance with ASTM D1238 at 190° C. with a 21,600 gram weight.

Melt index (MI, g/10 mins) was determined in accordance with ASTM D1238 at 190° C. with a 2,160 gram weight.

Environmental Stress Crack Resistance (ESCR, hrs) was determined according to ASTM D1693, Conditions A and B.

The Heterogeneity index was determined using size exclusion chromatography (SEC) analyses that were preformed at 140° C. on a Water, model 150 GPC with a refractive index detector. A solution concentration of 0.25 weight percent in 1,2,4-triclorobenzene was found to give reasonable elution times.

Polymer resins obtained by this invention are useful for blow molding applications. In these examples blow molding evaluations were conducted by blowing a one gallon (105.0±0.5 gm) bottle on a Uniloy 2016 single head blow molding machine using a 2.5 inch diameter die, 20 degree diverging die, 32% accumulator position, 8.5 second blow time, 0.10 second blow delay, 0.75 second pre-blow delay and a 45 degree ° F. mold temperature. A reciprocating screw speed of 45 rpm was used, providing parison extrusion at shear rates greater than 10,000/sec through the die.

Percent weight swell measures the amount the molten resin expands immediately as it exits the die. It is a measure of the "memory" of the polymer chains as they seek to relax and thus reform the polymer shape. Weight swell is an important parameter as it determines how tight the die gap must be adjusted to provide a constant bottle weight. If a resin has high weight swell, the die gap required will be tighter to make the proper part weight. In so doing, it will require higher stress to push the resin through the die than a lower weight swell resin. Weight swell is defined as the ratio of the final bottle wall thickness to the die gap.

Another measurement of swell is die swell or diameter swell. This is the ratio of the parison diameter to the die diameter. These numbers are referenced to a standard commercial blow molding polyethylene resin, Marlex 5502, obtained from Phillips Petroleum Company, and are thus called normalized die swell. The normalized die swell for other resins is reported as a ratio of the measured die swell divided by the die swell of the Marlex 5502 standard which was blown on the same machine as a control run during at about the same time.

Bottle stress crack resistance was tested using ten 105 gram one gallon bottles made as described above on a Uniloy 2016 machine. The bottles were filled with a 10% Orvus-K detergent solution, capped, and placed in a 140 degree ° F. hot room. Bottle failures were noted each day, and a 50% mean failure time was calculated for each set.

Extruder-capillary die melt fracture results were obtained using a 1 inch Killion single screw extruder (KL-100) fitted with a barrier screw. Capillary dies were attached to the end of the extruder with an adaptor. The adaptor was fitted with a Dynisco pressure transducer (model TPT432A) with a measurement range of 0–5000 psi, which was located just upstream of the entry to the capillary die. A two-piece capillary die was used. The first section consisted of a detachable orifice (entry angle 90 degrees and zero land length) with an entry diameter of 1 inch and a exit diameter of 0.15 inches. The second section consisted of a capillary with a 0.150 inch diameter and 2.25 inch land length (L/D=15).

A typical experiment would consist of extruding a polymer over a range of flow rates (screw RPM) using extruder, adapter, and die temperature settings of 170° C. Using the capillary die (described earlier) fitted to the orifice die, the pressure in the adapter, flow rate at various RPM were noted along with the RPM at which the onset of melt fracture occurred. Pressure drop versus flow rate data were also collected using the orifice die alone. Using standard calculations for flow through capillary dies, this data was then converted to true shear stress versus shear rate for each resin examined.

In some examples and some comparative examples the catalyst contained more than 1 weight percent chromium. In these cases extra chromium was added to the catalyst. This was accomplished by impregnating the catalyst to incipient wetness or somewhat less, with a methanol solution of chromium (III) nitrate containing 0.5 g Cr/100 mls.

Examples 1–4

These polymers were prepared in a continuous, particle form process by contacting a catalyst system with monomers, which employed a liquid full 15.2 cm diameter pipe loop reactor having a volume of 23 gallons (87 liters), isobutane as the diluent, and occasionally some hydrogen to regulate the molecular weight of the product. The reactor was operated to have a residence time of 1.25 hours. The reactor temperature was varied over a range of 95° C. to 107° C., depending on the particular experiment, and the pressure was four Mpa (580 psi). At steady state conditions the isobutane feed rate was about 46 liters per hour, the ethylene feed rate was about 30 lbs/hr, and the 1-hexene feed rate was varied to control the density of the polymer product. Polymer was removed from the reactor at the rate of about 25 lbs per hour and recovered in a flash chamber. A Vulcan dryer was used to dry the polymer under nitrogen at about 60–80 degrees ° C.

Ethylene that had been dried over alumina was used as the monomer. Isobutane that had been degassed by fractionation and dried over alumina was used as the diluent. Triethylboron or triethylaluminum was also sometimes used as a cocatalyst as indicated in the tables below.

A commercially available chromium catalyst system was purchased from the W. R. Grace Corporation. This chromium catalyst system was the 964 Magnapore Catalyst. It had a chromium content of about 1 weight percent based on the weight of the chromium catalyst system and about 5 weight percent titanium based on the weight of the total catalyst system. In Examples 1–3 extra chromium was added to the 964 Magnapore catalyst. This was accomplished by impregnating the catalyst to incipient wetness or somewhat less, with a methanol solution of chromium (III) nitrate containing 0.5 g Cr/100 mls.

Comparative Examples 1–15

These polymers were prepared in the same reactor and under the same process parameters as described above.

Various catalysts and cocatalysts were used in these runs as indicated in the table and descriptions below.

In comparative example 1 a commercially available chromium catalyst system was purchased from the W. R. Grace Corporation. This chromium catalyst system was the 969 catalyst. Titanium was added by first drying the catalyst in dry nitrogen in a fluidized bed at 400–500° F., then lowering the temperature to 250° F.–400° F. during which time titanium isopropoxide liquid was added over a period of about one hour. The titanium isopropoxide evaporated while transported by the nitrogen in a ⅛" stainless steel coil which introduced the vapor into the bottom of the bed. After all the titanium had been added, the nitrogen gas stream was replaced by dry air and the temperature was ramped up to the desired activation temperature in the usual fashion. The final catalyst composition was analyzed after activation.

In comparative examples 2 and 15 a commercially available chromium catalyst system was purchased from the W. R. Grace Corporation.

This chromium catalyst system was sold under the name of 965 Sylopore. This chromium catalyst was treated with titanium during activation as described earlier.

In comparative example 3 a chromium catalyst system was obtained from the W. R. Grace Corporation by spray drying a silica-titania-chromia hydrogel. This chromium catalyst system was called the SD Tergel catalyst.

In comparative example 4 a commercially available chromium catalyst system was purchased from the W. R. Grace Corporation known as HA-30. This chromium catalyst was treated with titanium during activation as described earlier.

In comparative examples 5 a commercially available chromium catalyst system was purchased from the W. R. Grace Corporation. This chromium catalyst system was sold under the name of 965 Sylopore.

In comparative example 6 a commercially available chromium catalyst system was purchased from the W. R. Grace Corporation. This chromium catalyst system was the 963 Magnapore catalyst. Extra chromium was added to the catalyst. This was accomplished by impregnating the catalyst to incipient wetness or somewhat less, with a methanol solution of chromium (III) nitrate containing 0.5 g Cr/100 mls.

In comparative example 7 and 8 a chromium catalyst system was obtained from the W. R. Grace Corporation, designated HPVSA indicating its relatively high pore volume and surface area compared to standard 969MS grades. Extra chromium was added to the catalyst. This was accomplished by impregnating the catalyst to incipient wetness or somewhat less, with a methanol solution of chromium (III) nitrate containing 0.5 g Cr/100 mls.

In comparative examples 10 to 14 a commercially available chromium catalyst system was purchased from the W. R. Grace Corporation. This chromium catalyst system was sold under the name 964 Magnapore. In examples 10, 11, and 13, extra chromium was added to the catalyst. This was accomplished by impregnating the catalyst to incipient wetness or somewhat less, with a methanol solution of chromium (III) nitrate containing 0.5 g Cr/100 mls In comparative example 9, a 964 Magnapore catalyst was produced except that no chromium was used in the process. Extra chromium was added to the catalyst. This was accomplished by impregnating the catalyst to incipient wetness or somewhat less, with a methanol solution of chromium (III) nitrate containing 0.5 g Cr/100 mls.

TABLE ONE

| EXAMPLE NUMBERS | 1 | 2 | 3 | 4 |
|---|---|---|---|---|
| PROCESS CONDITIONS | | | | |
| Surface area of Catalyst (m2/g) | 555 | 555 | 555 | 523 |
| Pore Volume of Catalyst (cm3/g) | 2.11 | 2.11 | 2.11 | 2.26 |
| Weight Percent of Titanium | 5 | 5 | 5 | 5 |
| Weight Percent of Chromium | 3 | 3 | 2 | 1 |
| Activation Temperature (° F.) | 1000 | 1000 | 1000 | 1000 |
| Cocatalyst used | TEB | TEB | TEB | TEB |
| Concentration of Cocatalyst (ppm) | 2 | 4 | 2 | 2 |
| POLYMER PROPERTIES | | | | |
| Shear Ratio (HLMI\MI) | 222 | 291 | 191 | 191 |
| High Load Melt Index (g/10 min.) | 17.8 | 17.4 | 21.0 | 17.2 |
| Density (g/cm3) | 0.9552 | 0.9564 | 0.9554 | 0.9567 |
| Heterogeneity Index (Mw\Mn) | 33.5 | 43.9 | 38.1 | 38.8 |
| ESCR Condition A (hours) | >1000 | >1000 | >1000 | >1000 |
| ESCR Condition B (hours) | 300 | 261 | 317 | 429 |
| Bottle ESCR (hours) | >700 | >700 | >700 | >700 |
| Die Swell (normalized) | 0.97 | 1.02 | 1.02 | 1.08 |
| Weight Swell (percent) | 410 | 457 | 392 | 395 |
| Melt Fracture (sec-1) | 2194 | 2169 | 2155 | 2200 |

TABLE TWO

| COMPARATIVE EXAMPLE NUMBERS | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PROCESS CONDITIONS | | | | | | | | | | | | | | | |
| Surface area of Catalyst (m2/g) | 300 | 400 | 510 | 500 | 400 | 500 | 577 | 300 | 559 | 550 | 533 | 500 | 550 | 500 | 400 |
| Pore Volume of Catalyst (cm3/g) | 1.7 | 1 | 0.85 | 1.5 | 1 | 2.42 | 2.21 | 2.5 | 2.12 | 2.26 | 2 | 2.2 | 2.26 | 2.2 | 1 |
| Weight Percent of Titanium | 3 | 5 | 5 | 3.6 | 3.6 | 2.5 | 0 | 0 | 5 | 5 | 5 | 5 | 5 | 5 | 5 |
| Weight Percent of Chromium | 1 | 1 | 1 | 1 | 1 | 2 | 2 | 2 | 0.2 | 2 | 2 | 1 | 2 | 1 | 1 |
| Activation Temperature (° F.) | 1250 | 1200 | 1100 | 1100 | 1100 | 1000 | 1000 | 1200 | 1100 | 1100 | 1100 | 1100 | 1100 | 1000 | 1100 |
| Cocatalyst used | TEB | TEB | TEB | None | TEB | TEB | TEB | TEB | TEB | TEB | None | None | TEA | None | None |
| Concentration of Cocatalyst (ppm) | 6.2 | 0.5 | 8 | 0 | 2.1 | 2 | 2 | 2 | 5 | 2 | 0 | 0 | 2 | 0 | 0 |
| Shear Ratio (HLMI/MI) | 128.6 | 108 | — | 93.5 | 81 | 174.5 | 137.5 | 156.9 | 100 | 248 | 87 | 68 | 139 | 63.1 | 86 |
| High Load Melt Index (g/10 min.) | 37.3 | 25 | — | 18.3 | 22.9 | 19.2 | 19.3 | 15.7 | 4 | 14.9 | 20.1 | 22.4 | 16.7 | 27 | 28.3 |
| Density (g/cm3) | 0.958 | 0.956 | — | 0.958 | 0.955 | 0.955 | 0.954 | 0.954 | 0.958 | 0.955 | 0.959 | 0.956 | 0.955 | 0.958 | 0.961 |
| Heterogeneity Index | 22 | — | — | — | 16.8 | 24.7 | 14.4 | 14.2 | 20.9 | 41.9 | 12.6 | — | 30.2 | 16.3 | 13.9 |
| ESCR Condition A (hours) | 200 | 250 | — | 100 | 170 | >1000 | 395 | 248 | — | >1000 | 209 | 293 | 304 | 116 | 69 |
| ESCR Condition B (hours) | 50 | 100 | — | 51 | 92 | 241 | 73 | 61 | — | 170 | 45 | 121 | 102 | 46 | 44 |
| Bottle ESCR (hours) | 180 | — | — | 150 | 245 | >700 | >700 | 508 | — | >700 | — | 375 | >700 | 143 | — |
| Die Swell (normalized) | 1.30 | 1.03 | — | 1.07 | 1.22 | 1.18 | 1.16 | 1.05 | — | 1.12 | 1.48 | 1.24 | 1.24 | 1.60 | 1.26 |
| Weight Swell (percent) | — | — | — | — | — | 436 | 375 | 349 | — | 434 | 353 | — | 330 | 544 | — |
| Melt Fracture (sec-1) | — | — | — | — | 601 | 2227 | 2241 | 2437 | — | 2196 | 1014 | — | 1624 | 544 | 601 |

It should be noted that Comparative Example Three produced no polymer. Additionally, it should be noted that "—" means that no measurement was conducted. It should be noted that even though Comparative Example 10 is considered a comparative run due to the values obtained for ESCR (B) and normalized die swell, these values are considered to be within the experimental error of these measurements.

That which is claimed is:

1. A polymer of ethylene and optionally a comonomer selected from alpha olefins having from 1 to 12 carbon atoms, said polymer having the following properties:

a density in the range of from about 0.94 to about 0.96, a HLMI in the range of about 5 to about 45 g/10 min, a shear ratio in the range of from about 150 to about 400, a Mw/Mn in the range of from about 15 to about 55 an ESCR condition A greater than about 1000 hours, an ESCR condition B greater than about 200 hours, a normalized die swell in the range of from about 0.8 to about 1.1, a weight swell in the range of from about 300 to about 500 percent, and an onset of melt fracture greater than about 2000 $sec^{-1}$; and wherein the polymer is a product of a process comprising polymerizing ethylene and optionally the comonomer, wherein said polymerizing is conducted using a catalyst that comprises chromium on a support and a cocatalyst that is an organoboron compound, wherein the amount of said chromium on said support is from about 0.5 to 5 weight percent, wherein said support consists essentially of silica and titania, wherein the support comprises between about 3.5 and 10 weight percent titania based on the weight of the support, and wherein the said support has a surface area of from about 400 to about 650 square meters per gram, and wherein said support has a pore volume from about 2 to about 2.7 cubic centimeters per gram, and wherein said catalyst has been activated at a temperature in the range of about 600° F. and 1100° F. in the presence of an oxidizing ambient.

2. A polymer according to claim 1 prepared from ethylene and 1-hexene.

3. A polymer according to claim 2 having a density in the range of about 0.953 to about 0.958.

4. A polymer according to claim 2 having a Mw/Mn greater than 30.

5. A polymer according to claim 4 having a density in the range of from about 0.953 to about 0.958.

6. A polymer of ethylene and optionally a comonomer selected from alpha olefins having from 4 to 12 carbon atoms, having a shear ratio of greater than 200 and a Mw/Mn greater than 30.

7. A polymer according to claim 6 having a density in the range of from about 0.94 to about 0.96.

8. A polymer according to claim 7 having an ESCR condition A greater than 1000 hours and an ESCR condition B greater than 2000 hours.

9. A polymer according to claim 8 having an onset of melt fracture greater than about 2000 $sec^{-1}$.

* * * * *

UNITED STATES PATENT AND TRADEMARK OFFICE
CERTIFICATE OF CORRECTION

PATENT NO. : 6,642,324 B2
DATED : November 4, 2003
INVENTOR(S) : Joseph J. Bergmeister et al.

It is certified that error appears in the above-identified patent and that said Letters Patent is hereby corrected as shown below:

Column 12,
Line 13, delete "greater than 30" and insert -- in the range from 20 to 50 --.
Line 16, delete "of ethylene and optionally a comonomer selected form alpha olefins having from 4 to 12 carbon atoms, having a shear ratio of greater than 200 and a Mw/Mn greater than 30" and insert -- according to claim 1 having a shear ratio in the range of from about 170 to about 350 and a Mw/Mn in the range form 20 to 50 --.
Line 21, delete "0.94 to about 0.96" and insert -- 0.95 $g/cm^3$ to 0.96 $g/cm^3$ --.
Line 24, delete "2000" and insert -- 300 --.
Line 26, delete "about 2000" and insert -- 2155 --.

Signed and Sealed this

Twenty-eighth Day of December, 2004

JON W. DUDAS
*Director of the United States Patent and Trademark Office*